March 12, 1940.  L. NAVIAS  2,193,640
GLASS-TO-METAL SEAL
Filed May 21, 1938
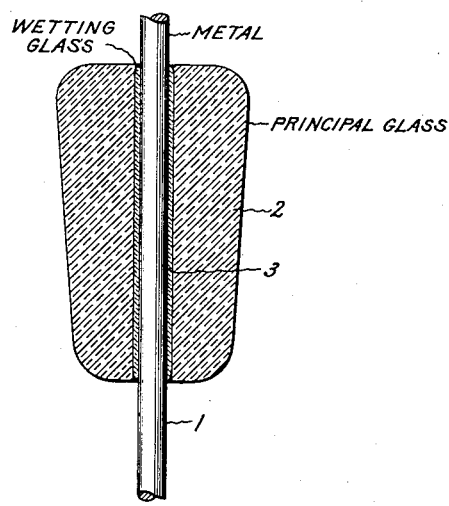
Inventor:
Louis Navias,
by Harry C. Dunham
His Attorney.

Patented Mar. 12, 1940

2,193,640

UNITED STATES PATENT OFFICE 2,193,640

GLASS-TO-METAL SEAL

Louis Navias, Schenectady, N. Y., assignor to General Electric Company, a corporation of New York Application May 21, 1938, Serial No. 209,286

4 Claims. (Cl. 176—50)

The present invention relates to glass-to-metal seals.

The production of a satisfactory glass-to-metal seal involves the fulfillment of several prerequisite conditions, one being that the expansion characteristics of the glass and metal must be properly matched and another that the glass must be capable of adhering strongly to the metal. The present invention is concerned with means for overcoming a deficiency in the latter respect when the first condition is adequately met.

The novel features which I desire to protect herein are pointed out in the appended claims. The invention itself may best be understood by reference to the following description taken in connection with the drawing, wherein the single figure comprises a cross-sectional view of a glass-to-metal seal in which the invention is embodied.

While not limited thereto, the invention is especially useful in connection with seals in which the metallic element includes iron as a primary ingredient thereof. Nickel-iron alloys in particular are well adapted for sealing purposes since the thermal expansion characteristics of many of them exhibit a sharp bend or transformation zone at an elevated temperature. Since this is also a characteristic of all glasses, there is presented the possibility of making strain-free sealing combinations by combining appropriately chosen nickel-iron alloys with glasses of similar expansion properties. It is unfortunately true, however, that certain glasses and especially lead glasses which have expansion characteristics in the proper range and which possess other desirable properties are incapable of adhering satisfactorily to the iron-containing metals. This fact makes it impossible in many cases to form permanent and gas tight seals from combinations which might otherwise be thought promising.

I have found that this difficulty can be overcome in most instances by interposing between the preferred glass and the metal a thin layer of a lead-free glass or other vitreous material which is capable of adhering to the metal. By this means, even though the expansion characteristics of the intermediate glass are not well matched to those of the metal, a satisfactory assembly can be provided.

A construction of the type referred to is illustrated in the drawing wherein an inner metal body 1 is sealed through an outer body, such as a bushing 2, which consists of a glass having matched expansion characteristics but inferior wetting properties. This latter deficiency is overcome by the use of an interposed integrally fused layer 3 consisting of a glass which is adapted to adhere strongly to the metal. (The line of demarcation which is shown in the drawing between the two glasses would, of course, not exist in actual practice.) If the layer 3 is thin (say 1/16 inch or less) relative to the outer glass 2, a considerable departure may exist between its expansion characteristic and that of the metal without danger of cracking. Apparently the outer glass acts to reinforce the intermediate glass and to prevent fracture thereof.

In making a seal of the type specified the intermediate glass may be applied to the metal by melting on solid shapes of glass or by melting on glass granules. If desired the granules may be finely divided and suspended in a liquid such as water if, necessary, with the addition of some type of suspending agent such as one of the clays used in vitreous enamels. The metal surface may be prepared by cleaning, chemical pickling or sand-blasting and may be oxidized or coated, as by electroplating with nickel or copper, to improve the adherence of the glass. The glass suspension may be applied by dipping, brushing or spraying, or in any other effective manner.

I have found the invention particularly useful in joining nickel-iron alloys to so-called lead glasses. As one example of a particular sealing combination in which the invention may be advantageously employed I may refer to an alloy comprising about 41.7% nickel and 58.1% iron with .2% manganese in combination with a principal glass having the following oxide composition:

| | Percent |
|---|---|
| $SiO_2$ | 34 |
| $B_2O_3$ | 28 |
| $Al_2O_3$ | 7 |
| $PbO$ | 29 |
| $Na_2O$ | 2 |

Both the glass and the metal specified have an average coefficient of linear thermal expansion over the range from 25° C. to 300° C. of about $5.2 \times 10^{-6}$ centimeters per centimer per degree centigrade. However, the adherence between them is not sufficiently good to enable a satisfactory seal to be made by joining them directly. This difficulty may be overcome by the use of a suitable intermediate glass, for example, a borosilicate glass, which is substantially free of lead and which has approximately the following oxide composition:

| | Per cent |
|---|---|
| $SiO_2$ | 62 |
| $B_2O_3$ | 29 |
| $Al_2O_3$ | 3 |
| $Na_2O$ | 6 |

The average coefficient of expansion of the last described glass is about $4.7 \times 10^{-6}$ which is materially different from that of the metal. However, if this glass is applied to the metal in a thin layer and is covered by a relatively thick body of the main glass previously referred to, a satisfactory and durable seal may be produced. Instead of the particular intermediate glass referred to, other adhering glasses may be employed such, for example, as the low expansion borosilicate glass sold under the trade name of Pyrex. Again one may use a vitreous enamel such as is used on steel or cast-iron as a vitreous coating and which has a high coefficient of expansion. Also the invention is capable of application in connection with various main glasses other than the particular lead glass referred to in the foregoing.

What I claim as new and desire to secure by Letters Patent of the United States is:

1. A seal comprising a body of metal, a body of a glass having expansion characteristics substantially the same as those of the metal but incapable of adhering thereto, and a vitreous material different from said glass interposed between said bodies and joining them together, the said vitreous material being capable of effectively wetting the metal and being in a layer sufficiently thin to minimize the possibility of fracture due to differences which may exist between the expansion characteristics of the vitreous material and the said metal.

2. A seal comprising a body constituted of a nickel-iron alloy, a body of glass having expansion characteristics substantially the same as those of the alloy but incapable of adhering thereto and a quantity of another glass interposed between said bodies and joining them to one another, the said other glass being capable of effectively wetting the said alloy and being in a layer sufficiently thin to minimize the possibility of fracture due to differences between the expansion characteristics of such glass and the said metal.

3. A seal comprising an iron-nickel alloy, a lead glass having expansion characteristics substantially the same as those of the alloy but incapable of adhering satisfactorily thereto and a thin layer of a boro-silicate glass interposed between the lead glass and the alloy, the borosilicate glass having expansion characteristics unlike those of the alloy but being capable of effectively adhering to the alloy.

4. A seal comprising a body of a metal which contains iron as a primary ingredient thereof, a lead glass having expansion characteristics substantially matched to those of the metal but incapable of adhering satisfactorily thereto, and a layer of a lead-free vitreous material interposed between the lead glass and the metal body and joining them together, the lead-free vitreous material being capable of effectively adhering to the metal body.

LOUIS NAVIAS.